(12) United States Patent
Brodie et al.

(10) Patent No.: US 7,739,273 B2
(45) Date of Patent: Jun. 15, 2010

(54) METHOD FOR CREATING, EXECUTING AND SEARCHING THROUGH A FORM OF ACTIVE WEB-BASED CONTENT

(75) Inventors: Mark A. Brodie, Briarcliff, NY (US); Ryan K. Gunderson, Arvada, CO (US); Jonathan Lenchner, North Salem, NY (US); Gopal S. Pingali, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/120,414

(22) Filed: May 14, 2008

(65) Prior Publication Data

US 2008/0213740 A1 Sep. 4, 2008

Related U.S. Application Data

(63) Continuation of application No. 11/421,847, filed on Jun. 2, 2006, now abandoned.

(51) Int. Cl.
G06F 7/00 (2006.01)
G06F 17/30 (2006.01)
(52) U.S. Cl. .................. 707/722; 707/728; 707/734; 707/769
(58) Field of Classification Search .................. None
See application file for complete search history.

(56) References Cited

U.S. PATENT DOCUMENTS

| | | | |
|---|---|---|---|
| 5,734,837 A | 3/1998 | Flores et al. | |
| 5,765,138 A | 6/1998 | Aycock et al. | |
| 5,774,661 A | 6/1998 | Chatterjee et al. | |
| 5,826,239 A | 10/1998 | Du et al. | |
| 5,850,535 A | 12/1998 | Maystrovsky et al. | |
| 5,870,545 A | 2/1999 | Davis et al. | |
| 5,884,302 A | 3/1999 | Ho | |
| 5,937,388 A | 8/1999 | Davis et al. | |
| 6,131,085 A * | 10/2000 | Rossides .................. | 705/1 |
| 6,263,335 B1 | 7/2001 | Paik et al. | |

(Continued)

FOREIGN PATENT DOCUMENTS

WO 2007143516 12/2007

OTHER PUBLICATIONS

BEA Systems, Inc., "BEA White Paper—BEA AquaLogic Service Bus—It's Direct Route to SOA," printout from http://www.bea.com/content/news_events/white_papers/BEA_AQL_ServiceBus_wp.pdf, Jun. 2005.

(Continued)

*Primary Examiner*—Tim T. Vo
*Assistant Examiner*—Jay A Morrison
(74) *Attorney, Agent, or Firm*—Cahn & Samuels LLP (57) ABSTRACT

Xml pages are obtained from knowledge bases that contain step by step instructions. The xml pages are presented as "active content," by which we mean a series of prompted questions and answers. A user's interactions with the active content is recorded so that the results may be copied to the user's clipboard for automatic transfer to a problem management/ticketing system. Active content that contains embedded questions asked of the user may be used to infer answers to some of the questions from a search query, and, thus, alleviate the need for the user to answer them.

11 Claims, 6 Drawing Sheets

U.S. PATENT DOCUMENTS

| | | | |
|---|---|---|---|
| 6,339,838 B1 | 1/2002 | Weinman, Jr. | |
| 6,363,384 B1* | 3/2002 | Cookmeyer et al. | 707/10 |
| 6,453,269 B1 | 9/2002 | Quernemoen | |
| 6,473,794 B1 | 10/2002 | Guheen et al. | |
| 6,496,209 B2 | 12/2002 | Horii | |
| 6,523,027 B1 | 2/2003 | Underwood | |
| 6,526,404 B1* | 2/2003 | Slater et al. | 707/5 |
| 6,675,149 B1 | 1/2004 | Ruffin et al. | |
| 6,810,383 B1 | 10/2004 | Loveland | |
| 6,865,370 B2 | 3/2005 | Ho et al. | |
| 6,907,549 B2 | 6/2005 | Davis et al. | |
| 6,970,803 B1 | 11/2005 | Aerdts et al. | |
| 6,988,088 B1 | 1/2006 | Miikkulainen et al. | |
| 6,988,132 B2 | 1/2006 | Horvitz | |
| 7,010,593 B2 | 3/2006 | Raymond | |
| 7,039,606 B2 | 5/2006 | Hoffman et al. | |
| 7,114,146 B2 | 9/2006 | Zhang et al. | |
| 7,236,966 B1 | 6/2007 | Jackson et al. | |
| 7,260,535 B2 | 8/2007 | Galanes et al. | |
| 7,293,238 B1 | 11/2007 | Brook et al. | |
| 7,412,502 B2 | 8/2008 | Fearn et al. | |
| 2001/0047270 A1 | 11/2001 | Gusick et al. | |
| 2002/0019837 A1* | 2/2002 | Balnaves | 707/512 |
| 2002/0055849 A1 | 5/2002 | Georgakopoulos et al. | |
| 2002/0091736 A1* | 7/2002 | Wall | 707/513 |
| 2002/0111823 A1 | 8/2002 | Heptner | |
| 2002/0140725 A1 | 10/2002 | Horii | |
| 2002/0147809 A1 | 10/2002 | Vinberg | |
| 2002/0161875 A1 | 10/2002 | Raymond | |
| 2002/0169649 A1 | 11/2002 | Lineberry | |
| 2002/0186238 A1 | 12/2002 | Sylor et al. | |
| 2003/0004746 A1 | 1/2003 | Kheirolomoom et al. | |
| 2003/0018629 A1* | 1/2003 | Namba | 707/3 |
| 2003/0018771 A1 | 1/2003 | Vinberg | |
| 2003/0033402 A1 | 2/2003 | Battat et al. | |
| 2003/0065764 A1 | 4/2003 | Capers et al. | |
| 2003/0097286 A1 | 5/2003 | Skeen | |
| 2003/0101086 A1* | 5/2003 | San Miguel | 705/9 |
| 2003/0154406 A1* | 8/2003 | Honarvar et al. | 713/201 |
| 2003/0187719 A1 | 10/2003 | Brocklebank | |
| 2003/0225747 A1 | 12/2003 | Brown et al. | |
| 2004/0024627 A1 | 2/2004 | Keener | |
| 2004/0172466 A1 | 9/2004 | Douglas et al. | |
| 2004/0181435 A9* | 9/2004 | Snell et al. | 705/4 |
| 2004/0186757 A1 | 9/2004 | Starkey | |
| 2004/0186758 A1* | 9/2004 | Halac et al. | 705/7 |
| 2004/0199417 A1 | 10/2004 | Baxter et al. | |
| 2005/0027845 A1 | 2/2005 | Secor et al. | |
| 2005/0066026 A1 | 3/2005 | Chen et al. | |
| 2005/0091269 A1 | 4/2005 | Gerber et al. | |
| 2005/0114306 A1 | 5/2005 | Shu et al. | |
| 2005/0138631 A1 | 6/2005 | Bellotti et al. | |
| 2005/0159969 A1 | 7/2005 | Sheppard | |
| 2005/0187929 A1* | 8/2005 | Staggs | 707/4 |
| 2005/0203917 A1 | 9/2005 | Freeberg et al. | |
| 2005/0223392 A1 | 10/2005 | Cox et al. | |
| 2006/0067252 A1 | 3/2006 | John et al. | |
| 2006/0069607 A1 | 3/2006 | Linder | |
| 2006/0112036 A1 | 5/2006 | Zhang et al. | |
| 2006/0112050 A1 | 5/2006 | Miikkulainen et al. | |
| 2006/0129906 A1* | 6/2006 | Wall | 715/500 |
| 2006/0178913 A1 | 8/2006 | Lara et al. | |
| 2006/0224569 A1 | 10/2006 | DeSanto et al. | |
| 2006/0224580 A1 | 10/2006 | Quiroga et al. | |
| 2006/0235690 A1 | 10/2006 | Tomasic et al. | |
| 2006/0287890 A1 | 12/2006 | Stead et al. | |
| 2007/0043524 A1 | 2/2007 | Brown et al. | |
| 2007/0073651 A1 | 3/2007 | Imielinski | |
| 2007/0118514 A1* | 5/2007 | Mariappan | 707/3 |
| 2007/0168225 A1 | 7/2007 | Haider et al. | |
| 2007/0219958 A1* | 9/2007 | Park et al. | 707/3 |
| 2007/0234282 A1 | 10/2007 | Prigge et al. | |
| 2007/0282470 A1 | 12/2007 | Hernandez et al. | |
| 2007/0282622 A1 | 12/2007 | Hernandez et al. | |
| 2007/0282644 A1 | 12/2007 | Diao et al. | |
| 2007/0282645 A1 | 12/2007 | Brown et al. | |
| 2007/0282653 A1 | 12/2007 | Bishop et al. | |
| 2007/0282655 A1 | 12/2007 | Jaluka et al. | |
| 2007/0282659 A1 | 12/2007 | Bailey et al. | |
| 2007/0282692 A1 | 12/2007 | Bishop et al. | |
| 2007/0282776 A1 | 12/2007 | Jaluka et al. | |
| 2007/0282876 A1 | 12/2007 | Diao et al. | |
| 2007/0282942 A1 | 12/2007 | Bailey et al. | |
| 2007/0288274 A1 | 12/2007 | Chao et al. | |
| 2007/0292833 A1 | 12/2007 | Brodie et al. | |
| 2008/0215404 A1 | 9/2008 | Diao et al. | |
| 2009/0012887 A1 | 1/2009 | Taub et al. | |

OTHER PUBLICATIONS

Cape Clear Software, Inc., "Cape Clear 6.5", printout from http://www.capeclear.com/download/CC65_Broch.pdf, copyright notice 2005.

Cordys, "Cordys Enterprise Service Bus—Capabilities," printout from http://www.cordys.com/en/Products/Cordys_ESB_capabilities.htm, printed on Jun. 26, 2006.

Oracle, "Enterprise Service Bus," printout from http://www.oracle.com/appserver/esb.html, printed on Jun. 27, 2006.

PolarLake Limited, "Enterprise Service Bus (ESB) Resource Center," printout from http://www.polarlake.com/en/html/resources/esb/, printed on Jun. 27, 2006, copyright notice dated 2006.

Sonic Software, "ESB Architecture & Lifecycle Definition," printout from http://www.sonicsoftware.com/products/sonic_esb/architecture_definition/index.ssp, printed on Jun. 26, 2006.

Internet.com (http://www.webopedia.com/TERM/m/metadata.html).

Mercury, Mercury Capacity Planning (Powered by Hyperformix), 2004.

Team Quest, Capacity Planning with TeamQuest Analytic Modeling Software, printed from http://www.teamquest.com/solutions-products/solutions/planning-provis . . . on Jun. 4, 2006.

International Search Report and Written Opinion of the International Searching authority for International Application No. PCT/US07/70161, Jun. 16, 2008.

* cited by examiner

Figure 1

Figure 2: XML Rendition of Active Content

```xml
<?xml version = "1.0"?>
<graph>
<nodes>
<node id="0" name="Test1" type="Test" action="" text ="" name_label ="Say 'Based on your request type today, I will stay on the line and transfer your call over to correct support group'" comment="" />
<node id="2" name="State2" type="State" action="" text ="" name_label ="Done" comment="" />
<node id="3" name="Test2" type="Test" action="" text ="" name_label ="Press the Conference button on your phone" comment="" />
<node id="5" name="Test3" type="Test" action="" text ="" name_label ="Are you in EMEA?" comment="" />
<node id="6" name="Test4" type="Test" action="" text ="" name_label ="Dial 9 011 44 20 73 65 10 78 Option 1, Option 2, Option 2  (Dial 9 to get an outside line, then 011 for international, then 44 for the country code and then the phone number" comment="" />
<node id="7" name="Test5" type="Test" action="" text ="" name_label ="Dial 1-866-941-3355" comment="" />
<node id="8" name="Test6" type="Test" action="" text ="" name_label ="Do you get an agent?" comment="" />
<node id="9" name="Test7" type="Test" action="" text ="" name_label ="Agent will ask you for customer's name and brief description of the issue" comment="" />
<node id="10" name="Test8" type="Test" action="" text ="" name_label ="What is approximate hold-time?" comment="" />
<node id="11" name="Test9" type="Test" action="" text ="" name_label ="Document the other help desk's ticket number in your ticket. " comment="" />
<node id="12" name="Test10" type="Test" action="" text ="" name_label ="Press the Conference button to bring the caller back on line . " comment="" />
<node id="13" name="Test11" type="Test" action="" text ="" name_label ="Say 'Thank you for holding Callers Name, Agents Name will help you from here'" comment="" />
<node id="14" name="Test12" type="Test" action="" text ="" name_label ="Stay on hold until you get an agent" comment="" />
<node id="15" name="Test13" type="Test" action="" text ="" name_label ="Press the Conference button on your phone to bring the caller back on the line. You and the caller are now currently in the queue. " comment="" />
<node id="16" name="Test14" type="Test" action="" text ="" name_label ="Tell the caller 'Since it could be an extended period of time, I must drop off the line. Please continue to wait for the next agent'" comment="" />
<node id="17" name="Test15" type="Test" action="" text ="" name_label ="Press the Release button on the phone. " comment="" />
<node id="18" name="State1" type="State" action="" text ="" name_label ="Done" comment="" />
</nodes>
```

Figure 3 : XML Rendition of Active Content (Cont.)

```xml
<edges>
<edge source = "0" target = "3" label = "Customer willing to wait" />
<edge source = "3" target = "5" label = "OK" />
<edge source = "5" target = "6" label = "Yes" />
<edge source = "5" target = "7" label = "No" />
<edge source = "6" target = "8" label = "OK" />
<edge source = "7" target = "8" label = "OK" />
<edge source = "8" target = "9" label = "Yes" />
<edge source = "8" target = "10" label = "No" />
<edge source = "9" target = "11" label = "OK" />
<edge source = "10" target = "14" label = "Low (Under 2 minutes)" />
<edge source = "10" target = "15" label = "High (Over 2 minutes)" />
<edge source = "11" target = "12" label = "OK" />
<edge source = "12" target = "13" label = "OK" />
<edge source = "13" target = "2" label = "OK" />
<edge source = "14" target = "9" label = "OK" />
<edge source = "15" target = "16" label = "OK" />
<edge source = "16" target = "17" label = "OK" />
<edge source = "17" target = "18" label = "" />
</edges>
</graph>
```

METHOD FOR CREATING, EXECUTING AND SEARCHING THROUGH A FORM OF ACTIVE WEB-BASED CONTENT

The application is a continuation application of U.S. Ser. No. 11/421,847, filed on Jun. 2, 2006, the entirety of which is incorporated herein by reference.

FIELD OF THE INVENTION

The present invention is generally related to help desks and search methodologies, and more particularly related to active content and searching through content related to the fields of web-based content, mark-up languages and active content, including more particularly notions and standards such as html, dhtml (dynamic html), javascript, java applets and active-X controls.

BACKGROUND

In the prior art, in order to answer callers' problems, call takers must navigate through knowledge documents and follow documented procedures, during which time the callers are asked a series of questions. In such systems, after the problem is resolved or needs to be escalated to a higher level of support, the problem is documented in a problem management/ticketing system (such as, for example. commercial Peregrine and Remedy systems).

There presently does not exist a way to automatically track diagnostic steps and immediately transcribe the results into a ticketing or other recording system without a user having to independently spell out the details of the diagnostic steps taken. In addition, when a user describes their problem through an explicit or implicit search interface (either to a call taker, or in the context of self-help) to the self-help system, and when either the call taker or the user is taken to a knowledge document to resolve the problem, there presently does not exist a way to bypass questions in the knowledge document that are implicitly answered by the problem description/search query.

Accordingly, the present invention addresses one or more deficiencies of the prior art.

SUMMARY

In one embodiment, xml pages are obtained from knowledge bases that contain step by step instructions. The xml pages are presented as "active content," by which we mean a series of prompted questions and answers. A user's interactions with the active content is recorded so that the results may be copied to the user's clipboard for automatic transfer to a problem management/ticketing system.

In one embodiment, "active content" that contains embedded questions asked of the user may be used to infer answers to some of the questions from a search query, and, thus, alleviate the need for the user to answer them. In this manner, the embarrassment of the user feeling like they are saying the same thing twice may be minimized.

In one embodiment, a computer implemented system, wherein text-based documents are treated in a support knowledge repository as a set of structured directions, or queries for user information, comprises a problem determination engine that interacts with a user through a rendered text-based knowledge document and gathers answers to asked questions and provides the user with follow on information. The rendered text based document may comprise active content. The active content may comprise xml.

In one embodiment, a computer implemented system may comprise an authoring system, wherein the authoring system creates the active content. The active content may be interpreted as a sequence of procedural steps some of which may solicit information from the user. In one embodiment, a computer implemented system may comprise an executor, wherein in response to user interaction with active content, the executor captures contents of a history of asked questions and provided information and copies the contents to a system or application clipboard, or offers the user the option of copying said contents to a system or application clipboard. In one embodiment, a computer implemented system may comprise an executor, wherein in response to user interaction with active content, the executor captures contents of a history of asked questions and provided information and copies the contents into a problem ticketing system.

In one embodiment, a method for searching through a collection of standard text and active documents used in a product or system support environment includes rendering one or more text based document to comprise active content. In one embodiment, the active content comprises xml. In one embodiment, a method for searching through a collection of standard text and active documents used in a product or system environment includes identification of answers to questions in the documents. The answers may be identified in response to a user search query. The answers may be supplied to a problem determination engine. The problem determination engine presents the answers to the user. The engine may offer the user the ability to modify answers to questions erroneously presumed to be answered by the search query. A rank of query results may be increased based on the degree to which a problem description or search query implicitly answers the questions.

In one embodiment, a computer program product comprises a computer readable usable medium having computer usable code that renders text-based documents in a support knowledge repository as a set of structured directions or queries for user information. In one embodiment, a computer program product comprises a computer readable usable medium having computer usable code that implements an authoring system, wherein the authoring system renders text documents as active content. In one embodiment, a computer program product comprises a computer readable usable medium having computer usable code that implements a problem determination engine that walks a user through a rendered text-based knowledge document and gathers answers to asked questions and provides appropriate follow-on information. In one embodiment, the active content comprises xml.

In one embodiment, a knowledge document based system comprises one or more computer implemented text based knowledge document, wherein the one or more text based knowledge document comprise xml.

Other embodiments, other advantages, and other benefits will become apparent upon a reading of the included description, figures, and claims.

FIGURES

In FIGS. 2 and 3 there are seen representations of an xml document created according to one embodiment of the present invention.

DESCRIPTION

In the following discussion, the terms "certain embodiments", "an embodiment", "embodiment", "embodiments", "the embodiment", "the embodiments", "one or more embodiments", "some embodiments", "one embodiment", and other variants thereof, mean one or more (but not all) embodiments unless expressly specified otherwise. The terms "including", "comprising", "having" and variants thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Figure 1:
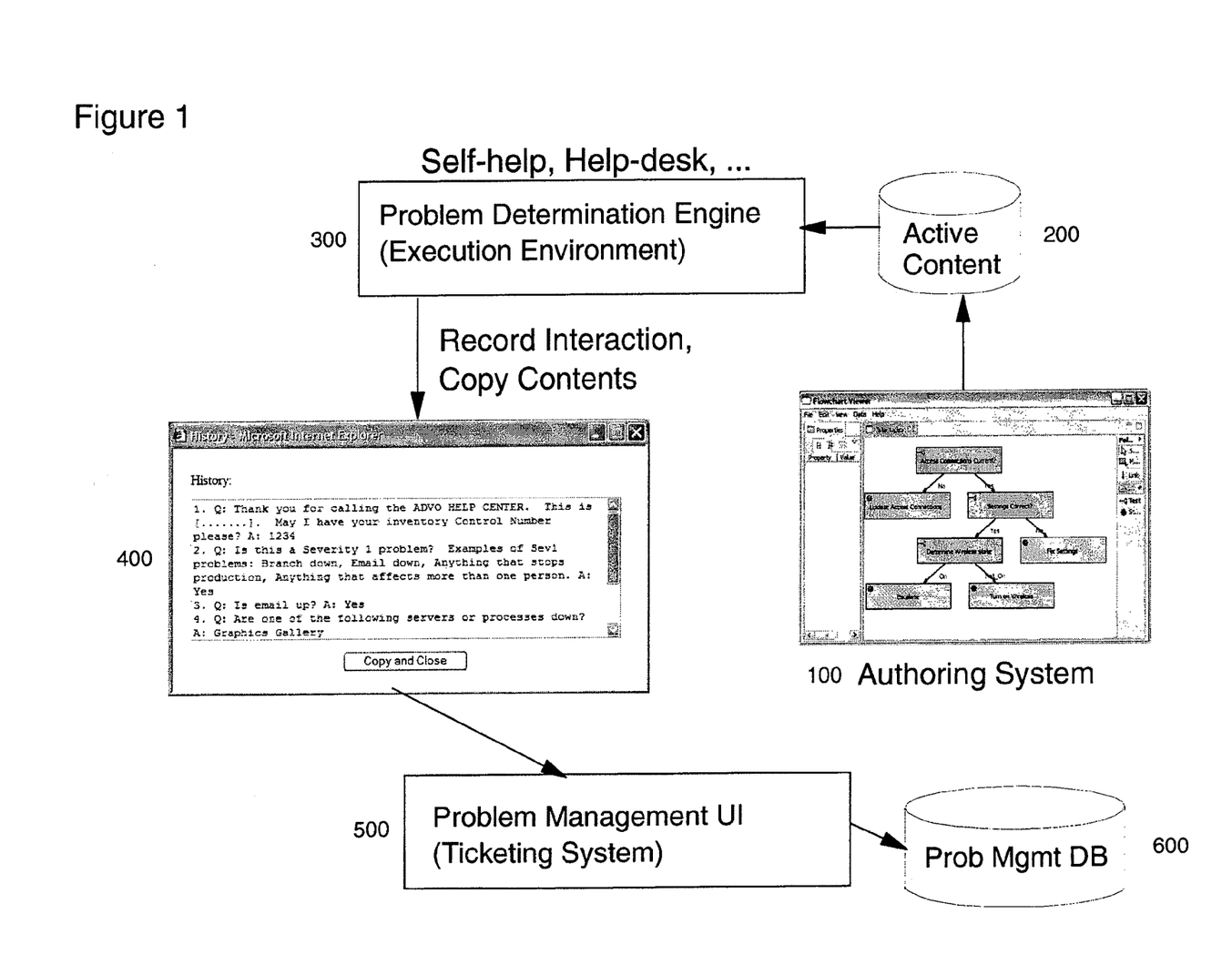
In FIG. 1 there is seen a representation of a high level system architecture and process.

Referring to FIG. 1, there is seen a representation of a high level system architecture and process used to enable embodiments of the present invention. In one embodiment, the present invention implements creation and storage of active content (step 200). In this embodiment, the active content is stored together with text documents that are part of a knowledge base of solutions to commonly found problems. In this embodiment, the active content is rendered by an authoring system (step 100) as a series of interactive, prompted steps, using a browser and back-end server software, for example by an application using a servlet/jsp paradigm, as is known to those skilled in the art. In a preferred embodiment, the authoring system is used to create active content as xml, and an independent "executor" executes ("walks") the directed graph (described by the xml) of content, prompting the user for questions and answers, all the while recording the interaction. In one embodiment, the authoring system includes a graphical user interface that assists in creating a sequence of questions and answers. The authoring system may help a user to visualize questions, and how different answers to a question may give rise to different subsequent questions. At the end of a question and answer session, presumably after either the problem is resolved, or the problem is deemed irresolvable given limitations of the content, a user may be given the option of copying a transcript of the interaction into the system clipboard for subsequent pasting into a problem management/ticketing system, or other means for routing to parties that need to be informed about the incident.

Figure 3:
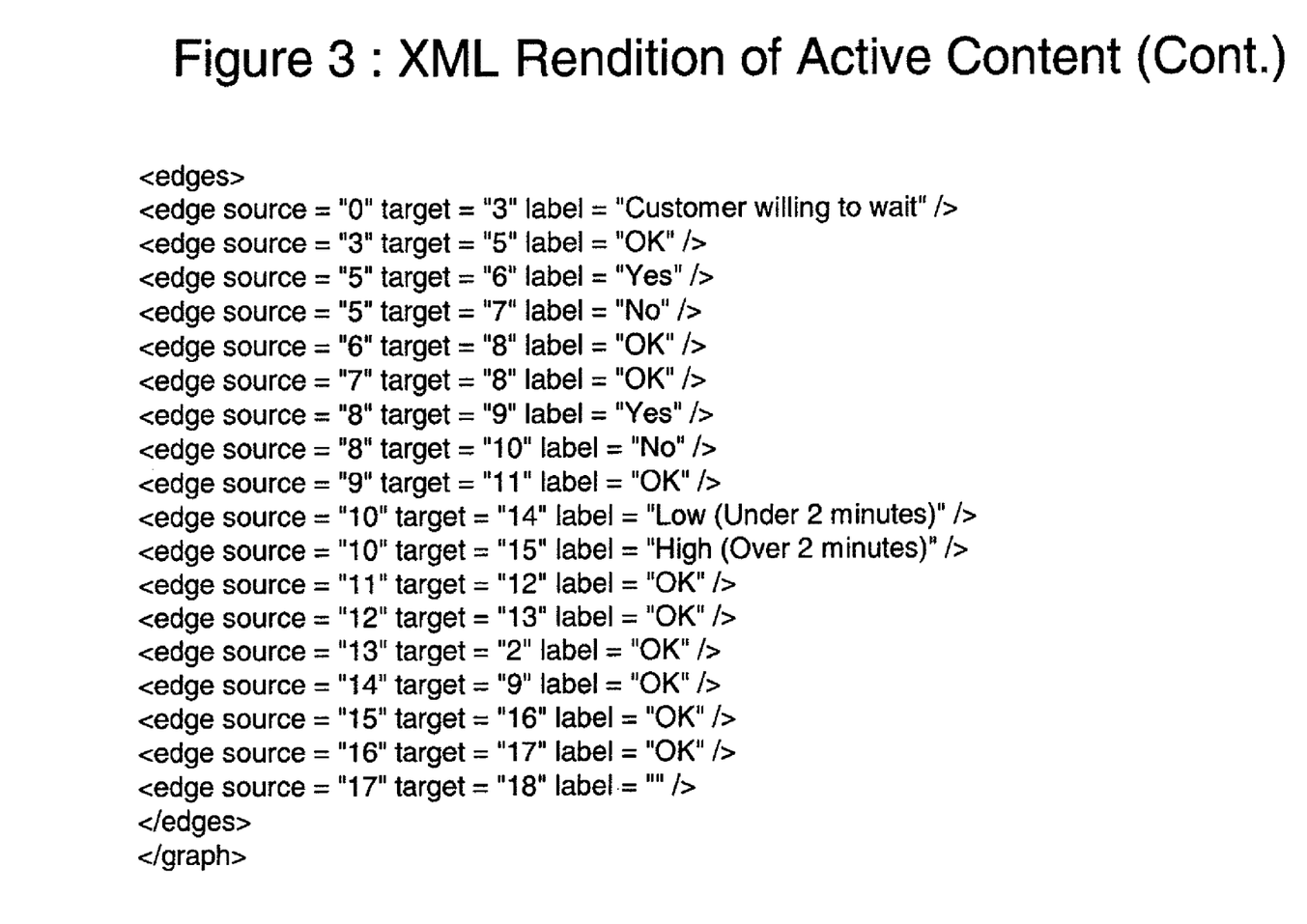

Referring now to FIGS. 2 and 3, there are seen representations of an xml document created according to one embodiment of the present invention. In addition to embodiments described herein, a user may create an xml document by hand and/or with the aid of any alternative xml editor. In the represented xml rendition of active content, one can see in a single xml file (FIG. 3 is meant to be concatenated at the bottom of FIG. 2 to form one xml file), an account of the nodes (questions and termination points), and edges (answers) of a directed graph that indicate a series of questions and answers needed to resolve a particular kind of help desk problem. In the embodiment represented by FIGS. 2 and 3, the graph is a snippet representing a handoff to another support group. Each node or question may include a number of attributes, which may comprise:

id—unique numerical identifier name—a textual name label for the question or termination point     type—either "test" indicating a question, or "state" indicating a termination point of the diagnosis     action—an optional URL of a web page that helps the user answer the question being asked, or in the case of a termination point the url of the problem resolution     text—in the case of a detailed question, the more detailed question     name_label—the label used in the graph viewing GUI to display, in brief, the question text. If text="" then the label is assumed to be the entirety of the question.

comment—an optional textual comment placed by the author. Has no consequence for execution.

In the xml rendition of active content, following the description of nodes (FIG. 2), there is seen a description of (directed) edges (FIG. 3). Edges may comprise the following attributes:

source—node id of the question to which this edge represents one of the answers     target—node id of the question following the one just asked given the answer described by this edge     label—textual answer to the question with node id=source.

Together, the nodes and edges describe a complete directed graph containing all questions and answers that lead to a diagnosis and resolution of the problem or problem family of the active content document.

Referring back to FIG. 1, after the active content is created, either using an authoring system or otherwise, the generated mark-up text may be stored in a content repository (step 200) for later retrieval, either by the authoring system (i.e. if a revision to the flow is needed) or by a system that interactively prompts users for answers to questions (step 300), for example, using a system that we refer to variously as the Problem Determination Engine, the Execution Engine, or simply the "Executor."

Figure 4:
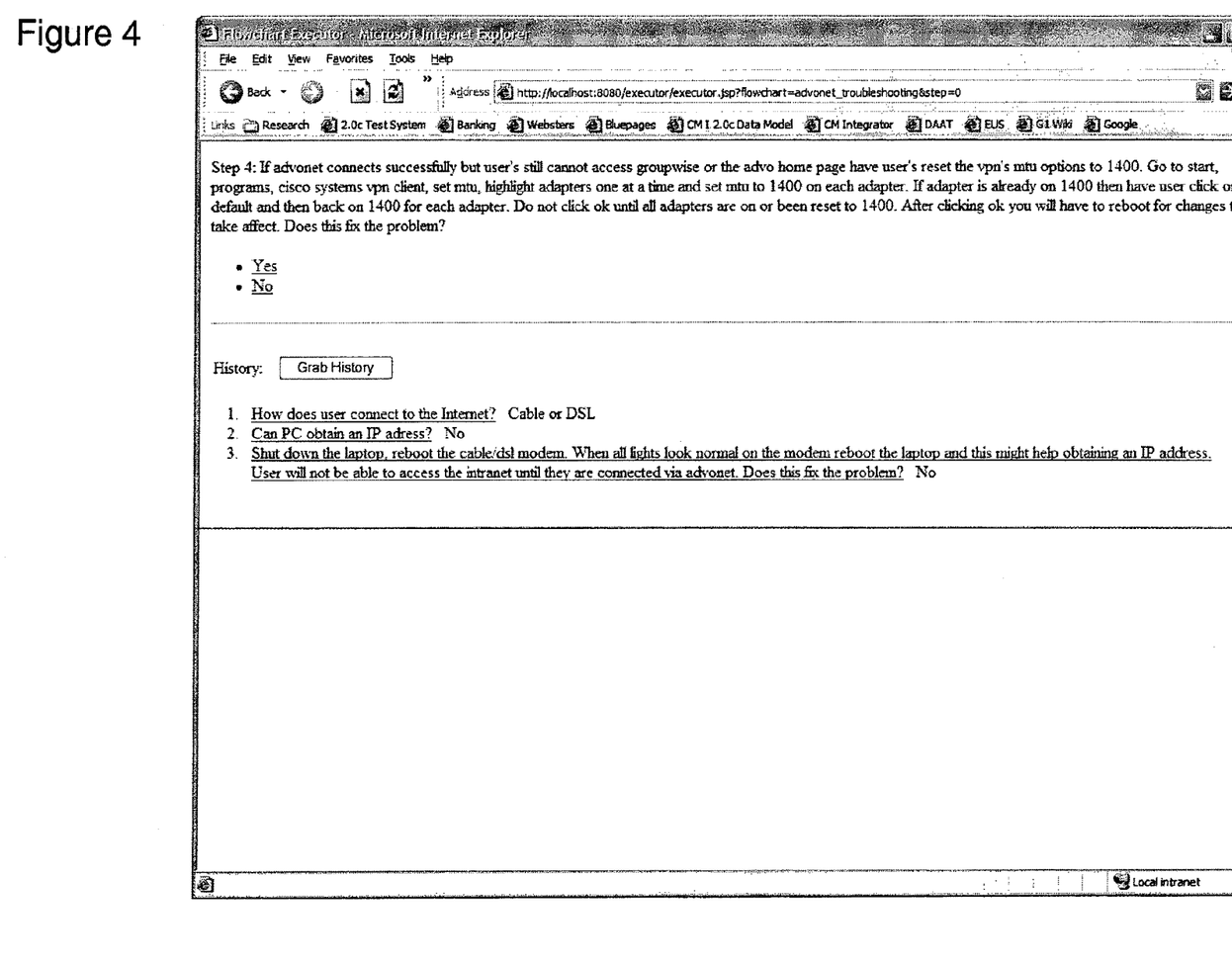
In FIG. 4 there is seen a representation of a screen shot of a Problem Determination Engine.

Referring now to FIG. 4, there is seen a representation of a screen shot of a Problem Determination Engine used in (step 300) of FIG. 1. In FIG. 4, there is seen that a user may be presented with a question, a set of answers, and a list of previously asked questions and their answers. In one embodiment, the bottom frame may be empty, but optionally can be used to help a user to answer the question. In one embodiment, a user may go back to a previously answered question by clicking on the question hyperlink and changing the previous answer. In FIG. 4, there is seen that a user may also click on a Grab History button, in which case the historical interaction may be copied into a text box. The user may then click on a Copy and Close button to copy the historical interaction transcription into a clipboard (step 400) and then paste the contents into a problem ticketing system (step 500), from which the ticket may be directed to a Problem Management Database (step 600) for reporting, further routing, and sharing the experience with other call takers or, in a self-help environment, by end users.

The present invention identifies that search methodologies may be beneficially implemented to search the aforementioned active content, or a mixture of active content and traditional documents. Searches of knowledge documents may be performed in either a self-help or call center environment, wherein one may enter search terms or a description of one's problem to perform a keyword search that returns matching documents. In this manner, users may be encouraged to provide reasonable descriptions of their problems in a search query and then to use semantic analysis to discern when questions being called out by the active content are either explicitly or implicitly being answered. Because there maybe some doubt as to whether the answers believed to be implied by the search are in fact implied by the search, a user can be presented with the answers in a way such that the answers can readily be changed (i.e. as in the previously discussed FIG. 4). It is noted that in a typical call-center interaction, users typically describe their problem to the call-taker, so this description would normally be entered in its entirety as a search query.

Figure 5:
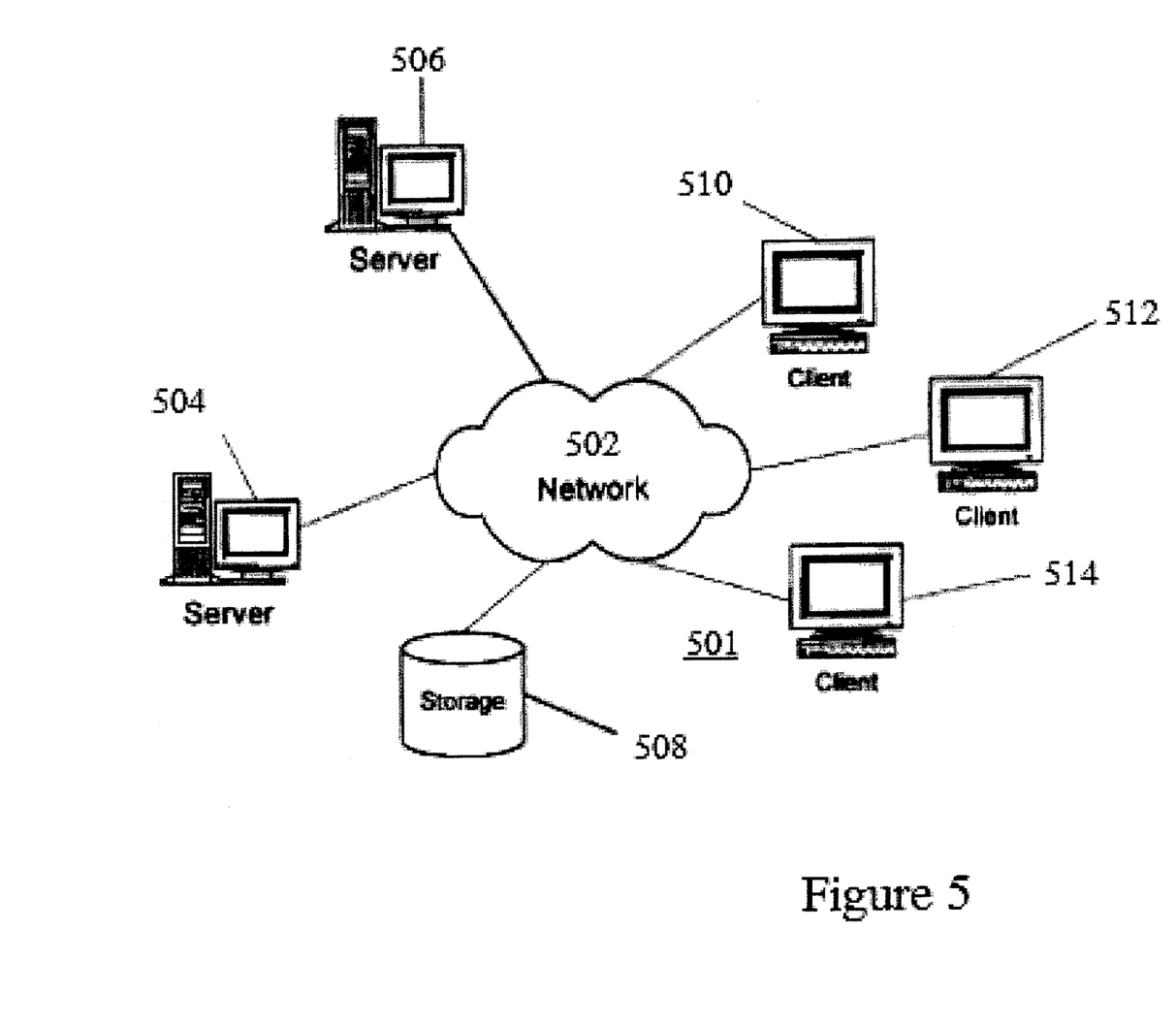
In FIG. 5 there is seen a representation of a system, wherein one or more of the embodiments of the invention described herein may be implemented.

Referring now to FIG. 5, there is seen a representation of a system 501, wherein one or more of the embodiments of the invention described herein may be implemented. System 501 may comprise a network 502, wherein one or more clients 510, 512, 514 are operatively coupled to communicate with one or more servers 504, 506, and one or more storage devices 508, as could be implemented by those skilled in the art. Client/server may describe a relationship between two computers/programs in which one computer/program, the client, makes a request for service to another computer/program, the server, which fulfills the request. Although the client/server idea can be used by programs within a single computer, it is applicable to a network of computers as well. In a network, the client/server model provides a convenient and efficient way to implement and interconnect needed hardware, firmware, and software that may distributed across different locations.

Figure 6:
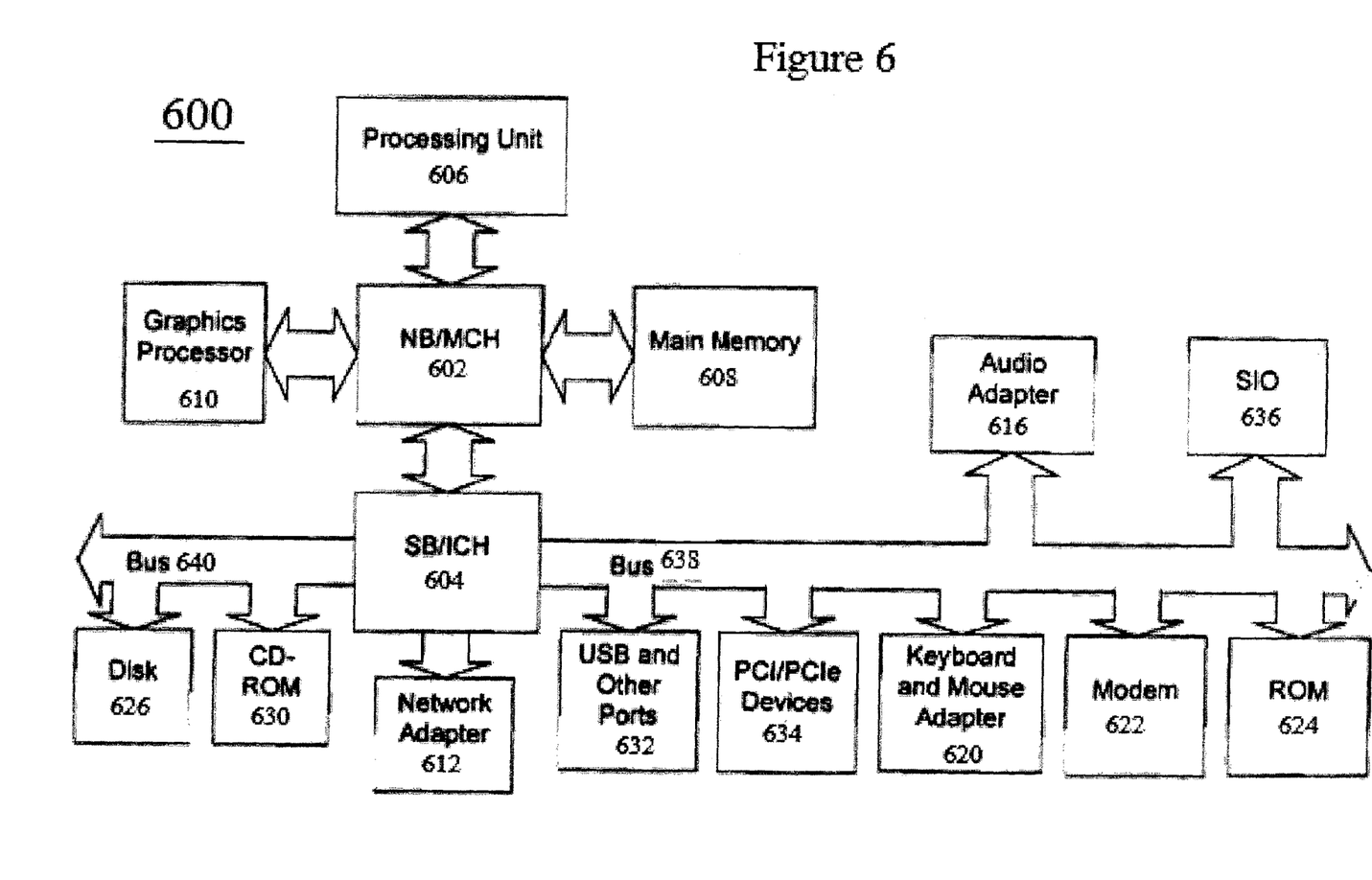
In FIG. 6 there is seen a representation of possible embodiments of a client, a server, storage and/or other devices(s), with which embodiments of the present invention may be implemented.

Referring now to FIG. 6, and other Figures as needed, there is seen a representation of possible embodiments of a client, a server, storage and/or other devices(s), with which embodiments of the present invention may be implemented. In embodiments, a client, a server, storage and/or other devices(s) may comprise one or more of the following: a processor 606, a memory 608 (e.g., a volatile memory device), storage devices 626, 630, 624, and other shown and unshown circuits, as are known and able to be implemented by those skilled in the art. In one embodiment, storage devices may be embodied as a non-volatile memory device, magnetic disk drive, optical disk drive, tape drive, etc. Storage may as well comprise an internal storage device, an attached storage device, and/or a network accessible storage device. Other possible components know to those skilled are represented and may be implemented as needed by those skilled in the art.

Accordingly, one or more of the embodiments described herein may as well be implemented by those skilled in the art as a method, apparatus or article of manufacture involving software, firmware, micro-code, hardware and/or combinations thereof. Certain embodiments of the present invention in system 501 may reside on and/or may be implemented in a processor, a memory, storage, circuit, hardware, firmware, software, etc. In one embodiment, the present invention may be deployed as computing instructions by a person or automated processing integrating computer-readable code into a computing system, wherein the code in combination with the computing system is enabled to perform the operations of the described embodiments. Certain ones of the operations described herein may be performed in parallel as well as sequentially. In alternative embodiments, certain of the operations may be performed in a different order, modified or removed. Furthermore, some of the elements have been described separately for purposes of illustration. Such components may be integrated into a fewer number of components or divided into a larger number of components. Additionally, certain operations described as performed by a specific component may be performed by other components.

The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that an article of manufacture may comprise any information bearing medium. For example, an article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Elements of the invention that are in communication with each other need not be in continuous communication with each other, unless expressly specified otherwise. In addition, devices that are in communication with each other may communicate directly or indirectly through one or more intermediaries. Additionally, a description of an embodiment with several elements in communication with each other does not necessarily imply that all such components are required. On the contrary a variety of optional elements are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for searching through a collection of standard text and active documents used in a product or system support environment, comprising:
   rendering one or more text based documents to comprise active content comprising a sequence of interactive questions and answers to solicit information from a user;
   storing the active content in a storage device comprising a repository;
   identifying answers to questions in the one or more text based documents, wherein the answers are identified in response to a user search query comprising a problem description;
   interactively prompting a user for answers to the questions and presenting the identified answers to the user in a graphical user interface, thereby bypassing questions in the one or more documents that are implicitly answered by analysis of the active content in response to the user search query and alleviating the need for the user to answer them;
   offering the user the ability to modify answers to questions erroneously presumed to be answered by the search query, wherein a rank of search query results is increased based on the degree to which a problem description or search query implicitly answers the questions;
   recording the user's interactions as a transcript; and
   copying the transcript into a system or application clipboard.

2. A method for searching through a collection of text and active documents used in a support environment, comprising:
   creating active content comprising a series of questions and answers to resolve a problem via a graphical user interface;
   storing the active content together with text documents comprising solutions to problems in a storage device comprising a repository;
   providing a user search query comprising a problem description;
   rendering one or more text documents in the repository as active content in response to the user search query;
   interactively presenting the user with a series of questions and answers to resolve a problem in the problem description;
   bypassing questions that are explicitly or implicitly answered by analysis of the active content in response to the user search query, thereby alleviating the need for the user to answer said questions;
   identifying answers to questions in the user search query by analysis of the active content and presenting the identified answers to the user in a graphical user interface;
   allowing the user to change answers erroneously presumed to be answered by the search query;
   recording the user's interactions as a transcript; and
   copying the transcript into a system or application clipboard.

3. A method according to claim 2, wherein the active content comprises an xml document comprising a directed graph of nodes comprising questions and edges comprising answers.

4. A method according to claim 2, wherein said rendering of one or more text documents in the repository is via a computer readable medium having computer usable code and selected from the group consisting of an electronic, magnetic, optical, electromagnetic, infrared or semiconductor device.

5. A method according to claim 2, further comprising transferring the transcript into a problem ticketing system.

6. A method according to claim 5, further comprising directing a ticket from the problem ticketing system to a problem management database for reporting, routing, or sharing with other users.

7. A method for searching through a collection of text and active documents used in a support environment, comprising:
   creating active content comprising a series of questions and answers to resolve a problem via a graphical user interface;
   storing the active content together with text documents comprising solutions to problems in a storage device comprising a repository;
   providing a user search query comprising a problem description;
   searching the text documents and active content to identify answers in response to the user search query,
   interactively presenting the user with a series of questions and answers in a graphical user interface to resolve a problem in the problem description;
   bypassing questions that are explicitly or implicitly answered by analysis of the active content in response to the user search query, thereby alleviating the need for the user to answer said questions;
   presenting a user with questions, a set of answers, and a list of previously-asked questions and their answers in a graphical user interface;
   allowing the user to change previous answers erroneously presumed to be answered by the search query,
   recording the user's interactions as a transcript; and
   copying the transcript into a system or application clipboard.

8. A method according to claim 7, comprising presenting the identified answers to the user.

9. A method according to claim 7, further comprising transferring the transcript into a problem ticketing system.

10. A method according to claim 7, wherein said searching the text documents comprises rendering the text documents as active content via a computer readable medium having computer usable code and selected from the group consisting of an electronic, magnetic, optical, electromagnetic, infrared or semiconductor device.

11. A method according to claim 7, wherein said searching the text documents comprises performing a keyword search to return matching documents.

* * * * *